A. FRYKMAN.
GEAR CUTTING MACHINE.
APPLICATION FILED OCT. 29, 1912.
1,108,735.
Patented Aug. 25, 1914.
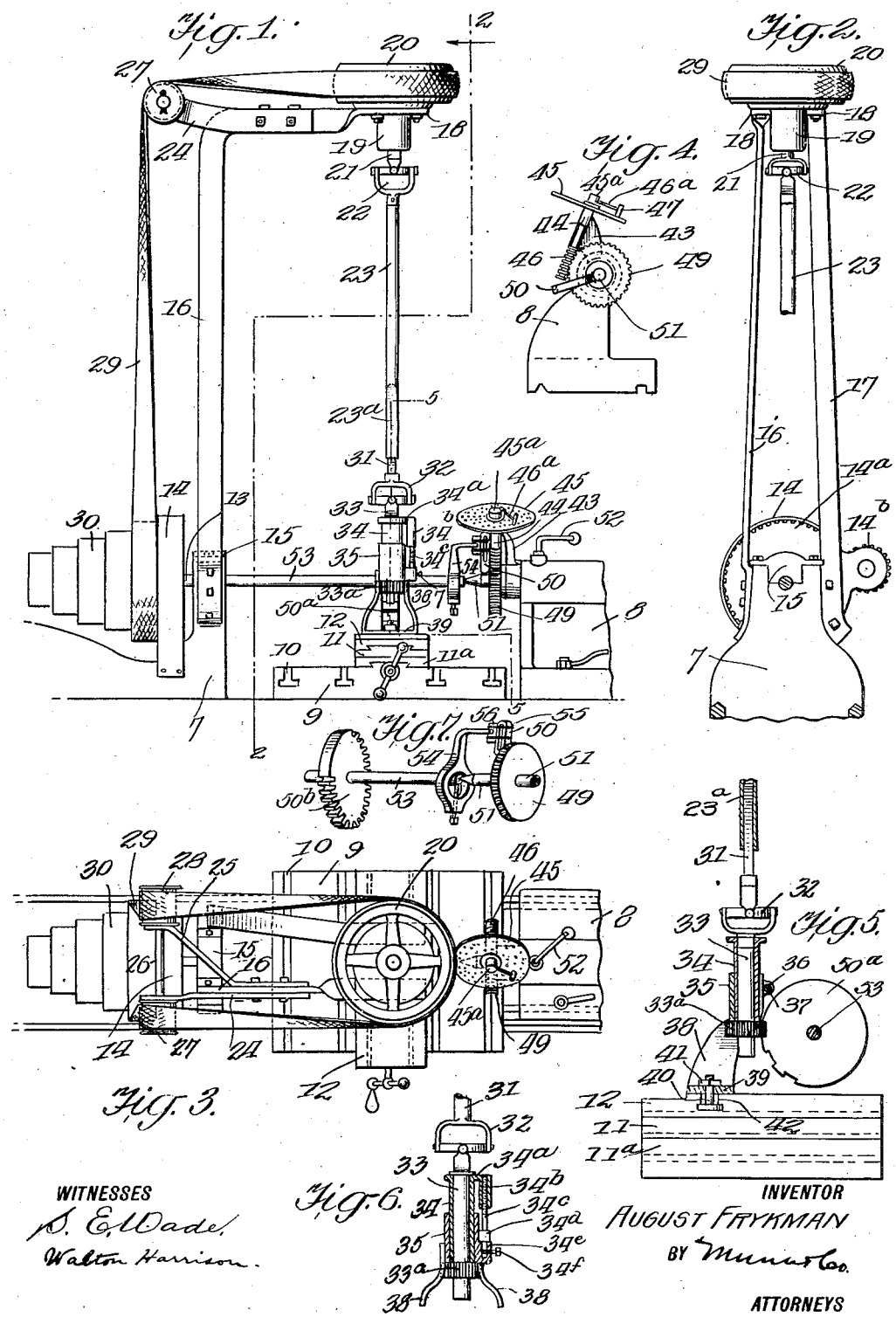
WITNESSES
S. E. Wade
Walton Harrison
INVENTOR
AUGUST FRYKMAN
BY Munn & Co.
ATTORNEYS

UNITED STATES PATENT OFFICE.

AUGUST FRYKMAN, OF SOURIS, NORTH DAKOTA.

GEAR-CUTTING MACHINE.

1,108,735.　　　　　Specification of Letters Patent.　　Patented Aug. 25, 1914.

Application filed October 29, 1912. Serial No. 728,343.

*To all whom it may concern:*

Be it known that I, AUGUST FRYKMAN, a citizen of the United States, and a resident of Souris, in the county of Bottineau and State of North Dakota, have invented a new and useful Improvement in Gear - Cutting Machines, of which the following is a specification.

My invention relates to gear cutting machines and more particularly, to devices of this type which are used as lathe attachments for cutting gears and for seating keys.

More particularly stated, my invention is a lathe attachment comprising mechanism for holding a gear wheel to be cut and for shifting the position of this gear wheel so as to properly space the teeth relatively to the position of the cutter; and also mechanism driven preferably from the lathe pulleys and including shafting provided with telescopic slides and universal joints for readily transmitting power to the gear cutter.

Reference is made to the accompanying drawing forming a part of this specification and in which like letters indicate like parts.

Figure 1 is a side elevation showing my device as applied to a lathe. Fig. 2 is a section on the line 2—2 of Fig. 1 looking in the direction of the arrow. Fig. 3 is a plan view of the mechanism shown in Fig. 1. Fig. 4 is a detail view showing the spacing mechanism for adjusting the gear into different positions suitable for cutting the teeth thereof. Fig. 5 is a detail view showing in fragmentary section the mountings for the cutter shaft and parts directly associated therewith. Fig. 6 is a detail view showing in fragmentary section the means for vertically adjusting the cutter and cutter shaft. Fig. 7 is a detail showing in perspective a gear blank partially finished and means for securing the blank relatively to the shaft carrying it.

The head stock of a lathe is shown at 7 and the tail stock of the machine appears at 8. The work table of the lathe appears at 9 and is provided with slots 10, ordinarily used to facilitate the positioning of the tool post holder. The tool post holder is a composite structure made up of plates 11, 11ª, 12 which are adjustable relatively to each other.

The head stock spindle is shown at 13 and is concentric to a gear casing 14 containing a driving gear wheel 14ª which meshes with a gear pinion 14ᵇ as will be understood from Fig. 2. The spindle 13 turns in a bearing 15 carried by the head stock 7. Mounted upon opposite sides of this head stock and extending upwardly therefrom are two standards 16, 17, made preferably of malleable metal and provided at their upper ends with horizontal extending portions 18. These portions support a bearing 19. A driven pulley is shown at 20 and is mounted rigidly upon a shaft section 21 which extends vertically through the bearing 19 and is connected by a universal joint 22 with another shaft section 23. The shaft section 23 is provided at its lower end with a hollow portion 23ª square in cross section. Connected rigidly with the standard 16 are two supporting arms 24, 25 which extend rearwardly from the top of the standard as indicated in Fig. 3. A shaft 26 is mounted in the outer or free ends of these arms 24, 25 and revolubly mounted upon the two ends of the shaft are pulleys 27, 28 adapted to turn in opposite directions. A driving belt 29 engages these pulleys and also pulley 20. The driving belt 29 also engages a stepped driving pulley 30 carried by the head stock spindle 13.

Fitting telescopically into the hollow square portion 23ª is the shaft section 31 which is made square for this purpose. The shaft section 31 is connected by a universal joint 32 with a cutter shaft 33, the latter being cylindrical in form and carrying at its lower end a milling cutter 33ª. This millcutter is made in any desired form and is secured upon the shaft in the manner well known in this art. The cutter shaft 33 is journaled in a bearing sleeve 34 which is normally stationary. This bearing sleeve is provided with a collar 34ª, the latter carrying a small sleeve 34ᵇ which is threaded internally. Fitting into the sleeve 34ᵇ and threaded exteriorly for the purpose is a bolt 34ᶜ. To facilitate rotation of this bolt, it is provided with a nut or enlarged angular portion 34ᵈ. The lower end of the bolt 34ᶜ is journaled in a pocket 34ᵉ and is provided with an annular groove, and fitting in this groove is a small stay bolt 34ᶠ.

The bolt 34ᶜ is seldom removed but it can be removed by taking out the stay bolt 34ᶠ. By loosening this stay bolt the bolt 34ᶜ, which I designate as an adjusting bolt, may be turned by aid of its angular portion 34ᵈ. The adjusting bolt 34ᶜ being thus rotated, the sleeve 34 is moved up or down an extent to commensurate with the degree of rotation of the adjusting bolt and the milling cutter 33 is thus raised or lowered to the same extent. The sleeve 34 is encircled by a split sleeve or socket 35, the latter being provided with ears 36 through which extends a bolt 37 as will be understood from Fig. 5. By tightening the bolt 37, the split sleeve 35 is gripped tightly upon the sleeve 34 so as to hold these parts firmly in any predetermined relative position into which they are adjusted. Secured to the split sleeve 35, for the purpose of supporting the same, is a spider or open pedestal 38, the latter carrying a base plate 39 integral with it. A bolt 40 which is fitted with a nut 41 is inserted within a slot 42 for the purpose of holding the pedestal 38 firmly in position upon the plate 12, so that the pedestal, and parts supported thereby, merely take the place of the ordinary tool holder.

Mounted upon the tail stock 8 and extending upwardly therefrom is a hanger 43 provided with a bearing 44. Mounted rigidly upon the upper end of this bearing is a gage plate 45. Extending through the gage plate and bearing is a shaft 45$^a$ provided at its lower end with a worm 46. A handle or arm 46$^a$ is secured to this shaft and extends radially therefrom. The arm 46$^a$ carries at its outer or free end a pawl 47 slidable relatively to the arm in the direction of the length thereof and adapted to slip partially into any one of the gage holes with which the gage plate 45 is provided, thus locking the arm into any one of a large number of different angular positions. A worm wheel 49 carries an arm 50 and is adapted to turn upon a taper pin 51. This taper pin is much like a tail center pin and if desired, the tail center pin of the lathe is taken out and the taper pin 51 inserted in its place. It is longer than the usual tail center pin to an extent commensurate with the thickness of the worm wheel 49. A piece of shafting is shown at 53 and mounted rigidly upon it is a gear blank 50$^a$ to be cut, as will be understood from Fig. 5. In this instance the teeth to be cut in the gear blank are quite large. A gear blank shown at 50$^b$ in Fig. 7 differs from the one shown at A in Fig. 5 merely in the style and size of the teeth to be cut. For enabling the worm wheel 49 to control the position of the shaft 53, I mount a dog 54 upon the shaft and by aid of fastenings 55 I secure a connecting block 56 to the arm 50 so that the tail of the dog rests against the connecting block.

The operation of my device is as follows:— The taper pin 51 placed in the position ordinarily occupied by the tail center pin as above described. The shaft 53 carrying the gear blank 50$^a$ (or 50$^b$) is now mounted so as to extend from the head stock to the taper pin 51. The dog 54 carried by the shaft 53 is next connected with the arm 50 as already stated. The operator, by turning the arm or handle 46$^a$ to a predetermined extent and lodging the bolt 47 in the proper hole of the gage plate 45 turns the gear blank into a suitable position to be cut. The pedestal 39 carried by the tool holder 12 is now moved by hand into proper position to bring the edge of the milling cutter 33$^a$ against the edge of the gear blank. By moving the pedestal 38 back and forth after the manner in which a tool rest is moved, the operator causes the milling cutter 38 to do the desired work upon the blank. The milling cutter during this time is rotated constantly by power supplied through the stepped pulley 30, the belt 29, idle pulleys 27, 28 and the driven pulley 20, thence through the shaft sections 23 and 33 to the milling cutter. After one cut is made, so as to form a space between two consecutive teeth of the gear blank, the operator by manipulating the arm 46$^a$ as above described causes the shaft 53 and the gear blank carried thereby to rotate and thus bring the gear blank into a suitable position for the next cut to be made, this operation being similar to the one already described.

When the device is used for cutting the key seat in a piece of shafting, the piece is mounted in position to extend from the head stock to the center pin of the tail stock and the pedestal 38 and parts carried thereby together with the plate 12 are moved into suitable position to enable the cutter 33$^a$ to engage the shaft so as to cut the key seat therein.

When my device is not in use, the plate 12 is simply moved out of the way so that the square shaft section 31 is disconnected from the hollow square portion 23$^a$ of the shaft section 23. This shaft section may now rotate idly, or if desired, the belt 29 may be disconnected so as to prevent rotation of the shaft section in question.

Having thus described my invention, what I claim as new and desire to secure by Letters Patent is as follows:

1. The combination with a lathe having a head stock and a tail stock, of means carried by said head stock at one end and said tail stock at the other end for supporting work, an L-shaped upright secured to the body portion of said lathe, a pulley carried by said L-shaped upright, said pulley being arranged to revolve in a horizontal plane around a vertical axis, means connected with the lathe operating mechanism for rotating said pulley, a shaft section secured to said pulley, a second shaft section, a universal joint connecting said first mentioned shaft section, and said second mentioned shaft section, a third shaft section, a universal joint connecting said second shaft section with said third shaft section, a cutter, means for adjustably securing said cutter to said third shaft section, said means comprising a sleeve slidably mounted on the shaft, a split socket encircling said sleeve, and means for causing a relative movement of said sleeve and said socket in a direction parallel to their common axes.

2. The combination with a lathe having a head stock and a tail stock, of means carried by said head stock at one end and said tail stock at the other end for supporting work, an L-shaped upright secured to the body portion of said lathe, a pulley carried by said L-shaped upright, said pulley being arranged to revolve in a horizontal plane around a vertical axis, means connected with the lathe operating mechanism for rotating said pulley, a shaft section secured to said pulley, a second shaft section, a universal joint connecting said first mentioned shaft section and said second mentioned shaft section, a third shaft section, a universal joint connecting said second shaft section with said third shaft section, a cutter, means for adjustably securing said cutter to said third shaft section, said means comprising a sleeve slidably mounted on the shaft, a split socket encircling said sleeve, and a screw bolt carried by said socket and having a threaded connection with said sleeve for effecting a relative movement of the sleeve and the socket along their common axes.

AUGUST FRYKMAN.

Witnesses:
HENRY W. PETERSON,
A. A. SWANSON.